J. V. PETRELLI.
REVERSING MECHANISM.
APPLICATION FILED JULY 15, 1919.
1,337,531.
Patented Apr. 20, 1920.
3 SHEETS—SHEET 1.
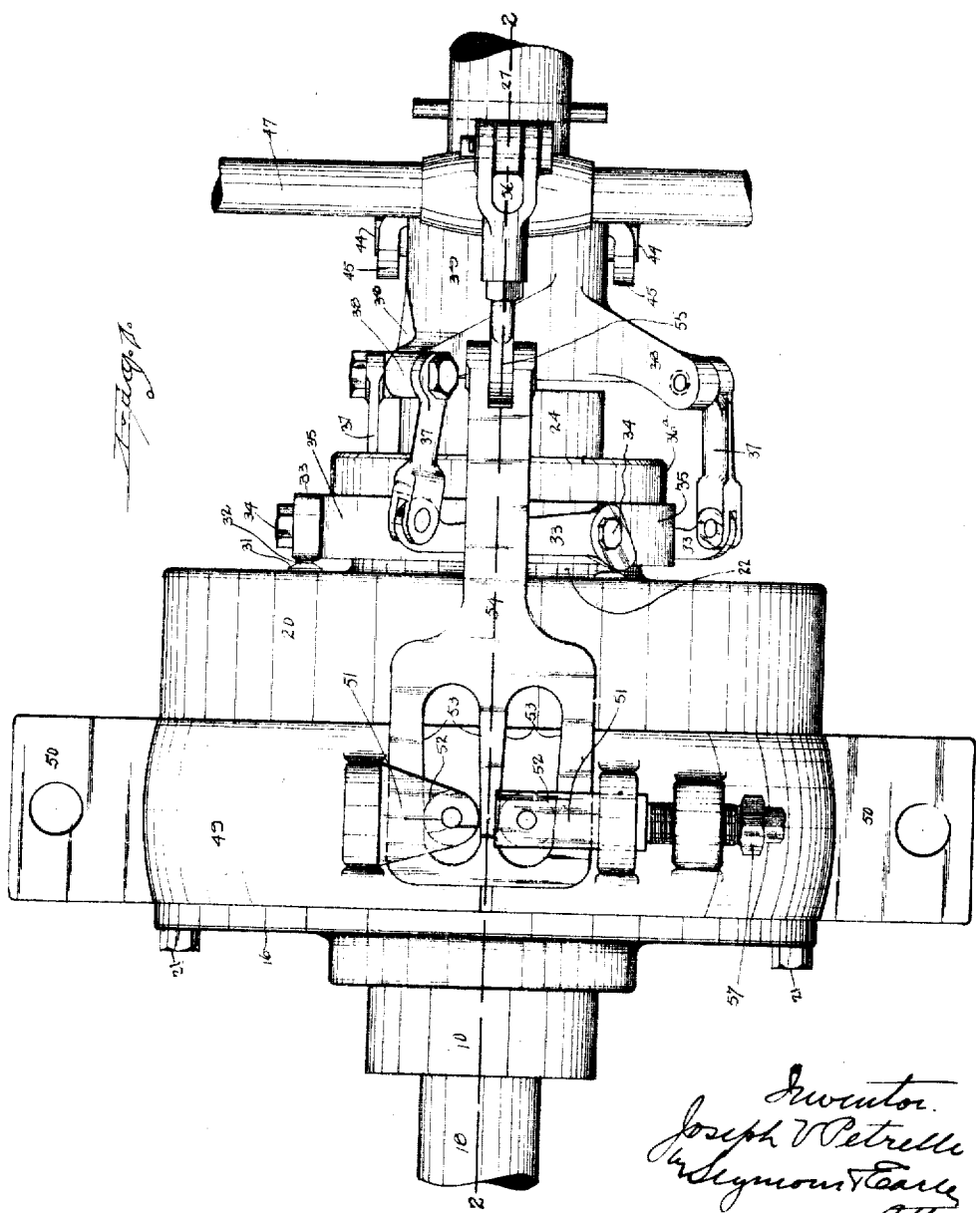

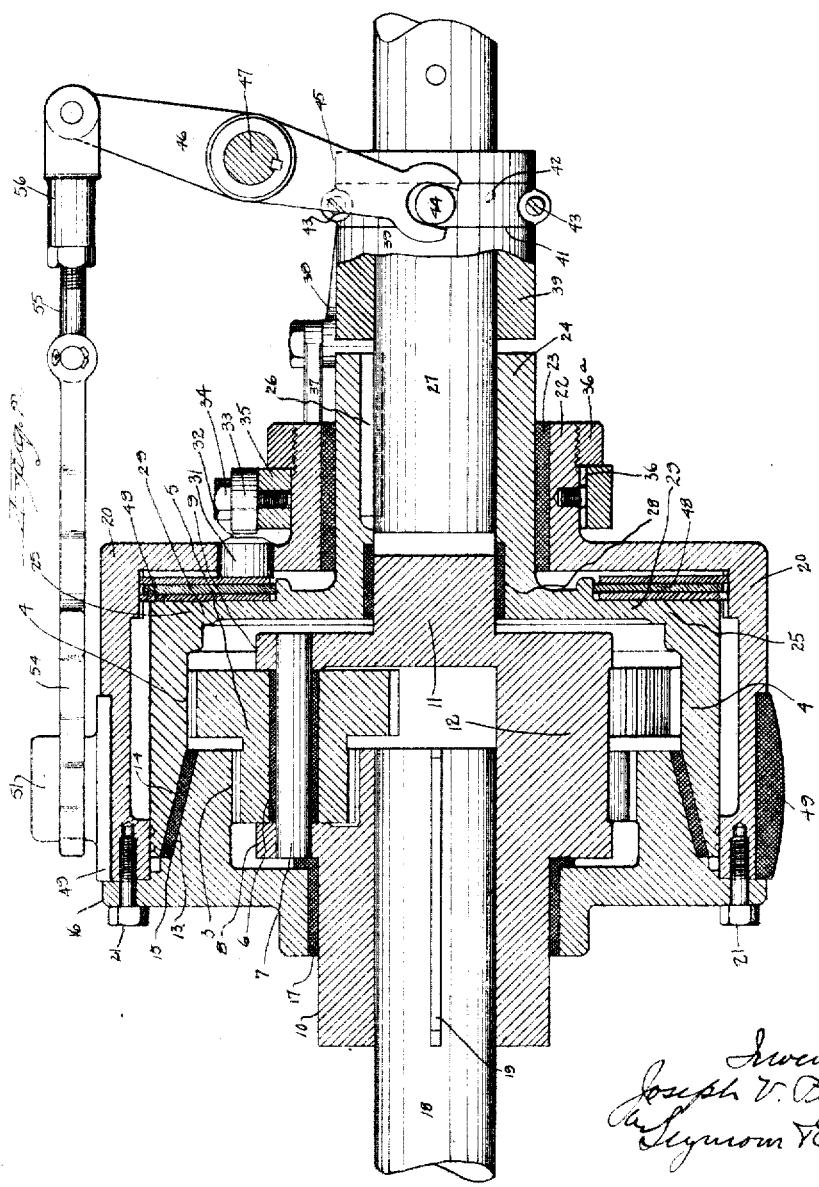

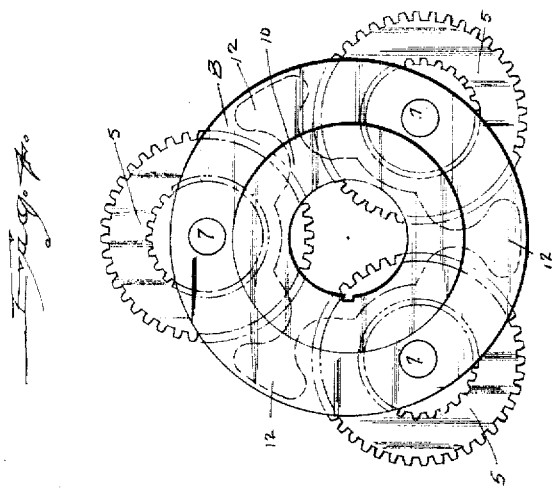
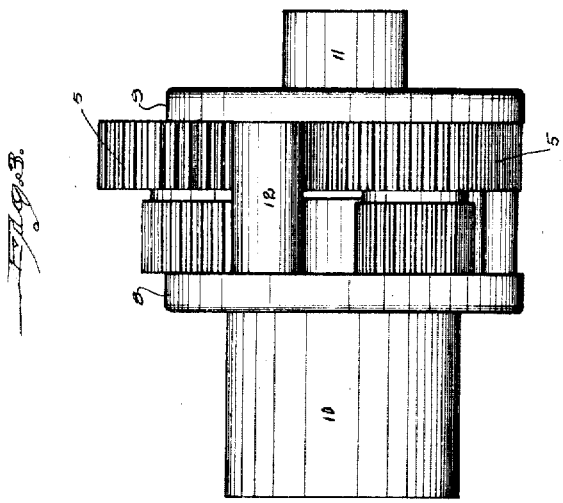

UNITED STATES PATENT OFFICE.

JOSEPH V. PETRELLI, OF NEW HAVEN, CONNECTICUT, ASSIGNOR TO THE NAVY GEAR MANUFACTURING CORPORATION, OF NEW HAVEN, CONNECTICUT, A CORPORATION OF DELAWARE.

REVERSING MECHANISM.

1,337,531.  Specification of Letters Patent.  Patented Apr. 20, 1920.

Application filed July 15, 1919. Serial No. 310,984.

*To all whom it may concern:*

Be it known that I, JOSEPH V. PETRELLI, a citizen of the United States, residing at New Haven, in the county of New Haven and State of Connecticut, have invented a new and useful Improvement in Reversing Mechanism; and I do hereby declare the following, when taken in connection with the accompanying drawings and the characters of reference marked thereon, to be a full, clear, and exact description of the same, and which said drawings constitute part of this application, and represent, in—

Figure 1 a plan view of a reversing mechanism embodying my invention, showing the parts in position for the reverse drive, and the driving and driven shafts broken away.

Fig. 2 a view thereof partly in section and partly in elevation, on the line 2—2 of Fig. 1.

Fig. 3 a detached view of the driving-member with its complement of double-pinions.

Fig. 4 an end view thereof.

My invention relates to an improved reversing mechanism primarily designed for motor boat use, but not so limited, the object being to produce a simple, strong, durable, compact and efficient mechanism.

With these ends in view, my invention consists in a reversing mechanism having its driving and driven members connected by two internal gears which are coupled together for the forward drive and geared together for the reverse drive.

My invention further consists in a reversing mechanism having certain details of construction as will be hereinafter described and pointed out in the claims.

In carrying out my invention as herein shown, I employ a fulcrum internal gear 3 and a driven internal gear 4, respectively carried by the driving and driven members of the mechanism, as will be hereinafter described. The said gears 3 and 4 are geared together by three pairs of equally spaced double-pinions 5 having bronze or other suitable metal bushings 6 and mounted upon pintles 7 entered at their respective ends into the flanges 8 and 9 of an integral driving-member also comprising a forwardly extending bearing-sleeve 10 and a rearwardly extending concentric trunnion 11, the flanges 8 and 9 being united by three equidistant transverse webs 12, as shown in Fig. 4. The smaller pinion-unit of each of the double-pinions meshes into the fulcrum internal gear 3, while the larger pinion unit of each of the double-pinions meshes into the driven internal gear 4, the larger pinion-unit having, as shown, double the number of teeth of the smaller-pinion unit. For the reverse drive, the driven internal gear 4 will, therefore, be reversely rotated with twice the speed of the fulcrum internal gear 3. However, this matter of speed will depend upon the relative sizes of the pinion-units of the double pinions and may be varied as desired.

As herein shown, the internal gears 3 and 4 are normally coupled for the forward drive by a friction cone-clutch comprising male and female members 13 and 14 separated by a tapered wearing-ring 15 of bronze or other suitable metal. The male clutch-member 13 upon the inner face of which the fulcrum internal gear 3 is formed, is made integral with the rear face of a circular case-cover 16 mounted upon the sleeve 10, from which it is separated by a wearing-ring 17 of bronze or equivalent material, the sleeve 10 receiving the driving-shaft 18 to which it is fastened by a key 19.

The said case-cover 16 fits over the open end of the cylindrical case-body 20 to which it is secured by bolts 21, the case-body being furnished with a rearwardly extending sleeve 22 separated by a wearing-ring 23 from the sleeve 24 of the cup-shaped driven-member 25, the said sleeve being fastened by a key 26 to the driven shaft 27 and providing a bearing for the trunnion 11 of the driving-member which turns within a wearing-ring 28 set into its forward end. The female member 14, aforesaid, of the friction cone-clutch is formed within the forward edge of the flange 29 of the said driven-member which has the driven internal gear 4 formed upon the inner face of the said flange.

It will be seen from the foregoing, that the driving and driven members of the mechanism are respectively provided for coupling the said driving and driven members for the forward drive.

For applying the friction clutch for the forward drive, when the entire gear-mechanism revolves as a unit, I employ, as herein shown, three short compression plungers 31 mounted in the rear wall of the case-body 20 in position to have their projecting rounded outer ends engaged by the faces 32 of three cam-levers 33 rocking upon screw-pivots 34 set radially in a ring 35 slidably mounted upon the rearwardly projecting bearing-sleeve 22 of the case-body, and held in place thereon by the key 36 and a nut 36ª. The outer ends of the said levers are pivotally connected by links 37, with complementary arms 38 radiating from a sleeve 39, on the driven-shaft 27. The said sleeve 39 is formed with an annular groove 41 receiving a two-part collar the parts 42 of which are secured together by screws 43 and respectively furnished with studs 44 receiving the slotted arms 45 of a yoke 46 mounted upon a horizontal shaft 47 having an operating handle which is not shown. By mounting the cam-levers 33 as described, they are not affected by the action of centrifugal force, the pivots on which they turn being at a right angle to the axis on which the mechanism as a whole rotates. The inner ends of the compression-plungers 31 act upon the outer disk of a multiple-disk friction clutch 48 the disks of which are interposed between the case-body 20 and the head 25 of the driven member. As shown, the said multiple-disk friction clutch comprises three disks of which the outer disks are connected in any suitable manner with the case-body, while the intermediate disk is connected in any suitable manner with the driven member. Of course the number of disks may be varied as desired. Furthermore, if desired, this multiple-disk friction clutch may take the place of the friction-cone clutch or vice versa, or both may be employed as shown, or a single disk providing a wearing-surface may be interposed between the compression-plungers and the driven member.

For the reverse drive, the housing is gripped and held against rotation by means of a brake-band 49 entering a circumferential recess in the outer face of the housing-body and formed with perforated horizontal arms 50 by means of which the reversing mechanism as an entirety, is installed in place. The adjacent ends of the brake-band are provided with arms 51 mounting rollers 52 respectively located within slots 53 inclined with respect to each other and formed in the forward end of a horizontal cam-plate 54, the rear end of which is connected by an eye-bolt 55 with a forked link 56 attached to the upper end of the yoke 46 which operates the brake-band at the same time that it operates the described toggle-mechanism controlling the friction-clutches. A set-screw 57 is provided for the adjustment of the brake-band in the usual manner.

For the forward drive, the shaft 47 is manually turned so as to apply the friction-cone clutch and throw off the brake, whereby the driving and driven members are frictionally coupled together and revolved as a unit with the base, and other parts of the mechanism with the exception of the brake mechanism, the yoke 46 and the ring 42. At this time, that is, during the forward drive, the gears revolve upon the axis of the mechanism as upon a center, but do not turn with respect to each other.

For the reverse drive, the brake mechanism is operated to grip the case and hold the same against rotation, and at the same time throw off the friction clutches between the respective internal gears so that the driven internal gear is free to rotate independently of the fulcrum internal gear, now held against rotation with the case. As the driving-member rotates, and it always rotates in the same direction, the teeth of the internal fulcrum internal gear 3 form points of purchase for the rotation of the double pinions which thus effect the rotation of the driven internal gear in the opposite direction at a rate of speed determined by the gear ratio. By employing two internal gears as described, the drive is made easy and quiet, and the strain upon the gear teeth reduced to the minimum. The mechanism is also made more powerful by the use of the internal gears as more teeth are simultaneously in mesh than under the old method.

I claim:—

1. A reversing mechanism having a fulcrum internal gear, a driven internal gear, pinions connecting the said internal gears for effecting the reverse rotation of the driven internal gear for the reverse drive, and means for coupling the two gears for the forward drive.

2. A reversing mechanism having a fulcrum internal gear, a driven internal gear, double pinions connecting the said internal gears for effecting the reverse rotation of the driven internal gear for the reverse drive, and means for coupling the two gears for the forward drive.

3. A reversing mechanism having a fulcrum internal gear, a driven internal gear, pinions connecting the said internal gears for effecting the reverse rotation of the driven internal gear for the reverse drive, and a friction clutch for coupling the two gears for the forward drive.

4. A reversing mechanism having a fulcrum internal gear, a driven internal gear, a driving member located within the said gears, pinions carried by the said driving member and respectively engaging with the said internal gears for effecting the reverse rotation of the driven internal gear for the reverse drive, and means for coupling the two gears for the forward drive.

5. A reversing mechanism having a fulcrum internal gear, a driven internal gear, a driving member located within the said gears, double pinions carried by the driving member and respectively engaging with the said internal gears for effecting the reverse rotation of the driven internal gear for the reverse drive, and means for coupling the two internal gears for the forward drive.

6. A reversing mechanism having a case, a fulcrum internal gear, a driven internal gear, means for coupling the two internal gears for the forward drive, a driving-member located within the said gears, and comprising a sleeve, two flanges and a trunnion; and pinions mounted between the flanges of the said driving-member and respectively engaging with the said internal gears for effecting the reverse rotation of the driven internal gear for the reverse drive at which time the fulcrum internal gear is held against rotation with the said case.

7. A reversing mechanism, having a fulcrum internal gear, a driven internal gear, pinions connecting the said internal gears for effecting the reverse rotation of the driven internal gear for the reverse drive, and a friction-cone clutch for coupling the two gears for the forward drive.

8. In a reversing mechanism, the combination with a case provided with a fulcrum internal gear, of a driving member carrying pinions, a driven-member provided with a driven internal gear, the said fulcrum internal and driven internal gears being connected by the said pinions which effect the reverse rotation of the driven internal gear for the reverse drive, and means for coupling the two gears for the forward drive.

9. In a reversing mechanism, the combination with a case comprising a case-body and a cover therefor, of a fulcrum internal gear located upon a rearward extension of the said cover, a driven-member located within the said case and comprising a head and a ring, and the said ring being provided with a driven internal gear, a driving-member located within the said case, pinions carried by the said driving-member and co-acting with the said driving and driven gears for effecting the reverse rotation of the driven internal gear for the reverse drive, means for holding the case against rotation, and a friction-cone clutch formed upon the said case-cover and ring for coupling the two gears for the forward drive.

10. In a reversing mechanism, the combination with a fulcrum internal gear, of a driven internal gear, a driving-member, pinions carried by the said member for connecting the said gears for effecting the reverse rotation of the driven internal gear for the reverse drive, a friction clutch for coupling the two gears for the forward drive, plungers and cam-mechanism for applying the said clutch, including cam-levers acting upon the said plungers, which operate upon the driven internal gear.

11. In a reversing mechanism, the combination with the case thereof, of a fulcrum internal gear connecting therewith, a driven internal gear, a driving-member carrying the said driven internal gear, pinions carried by the driving-member and connecting the said fulcrum internal and driven internal gears for effecting the reverse rotation of the driven internal gear for the reverse drive, means for coupling the two gears for the forward drive, means for holding the case against rotation for the forward drive, and means operating upon the driven-member for applying the said coupling-means.

12. In a reversing mechanism, the combination with a fulcrum internal gear, of a driven internal gear, a driving-member, pinions carried by the said driving-member and connecting the said gears for effecting the reverse rotation of the driven internal gear for the reverse drive, a friction clutch for connecting the two gears for the forward drive, and cam-mechanism for applying the said clutch, including cam-levers turning on pivots arranged at a right angle to the axis of the mechanism, whereby the action of centrifugal force upon the said levers is nullified.

In testimony whereof, I have signed this specification in the presence of two subscribing witnesses.

JOSEPH V. PETRELLI.

Witnesses:
 FREDERIC C. EARLE,
 CLARA L. WEED.